March 12, 1957     R. G. LE TOURNEAU     2,784,836
SELF-CLEANING CHAINS AND SUPPORTING SPROCKETS
Filed April 5, 1954     2 Sheets-Sheet 1
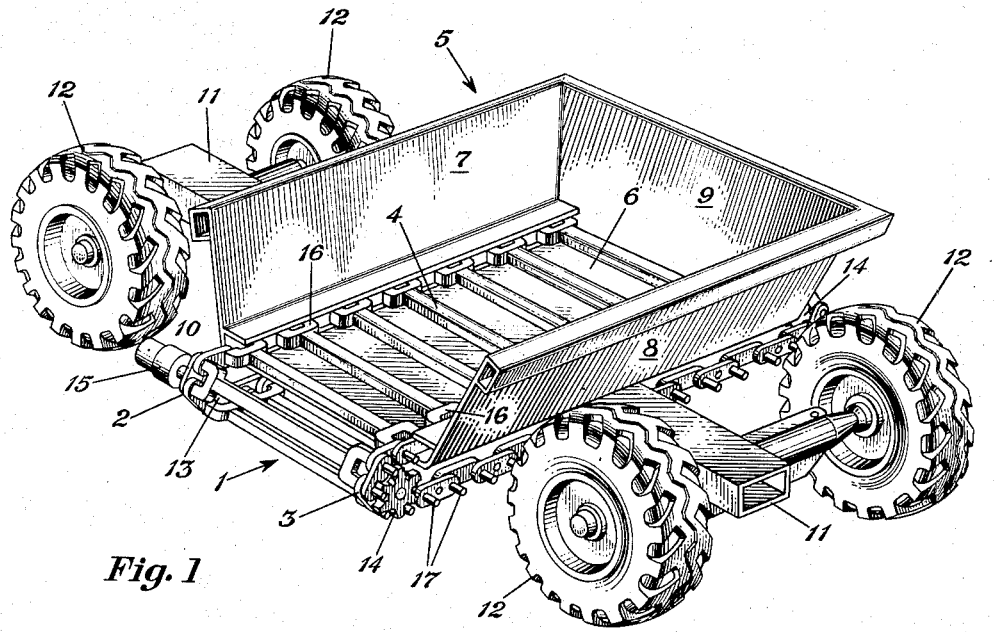
Fig. 1
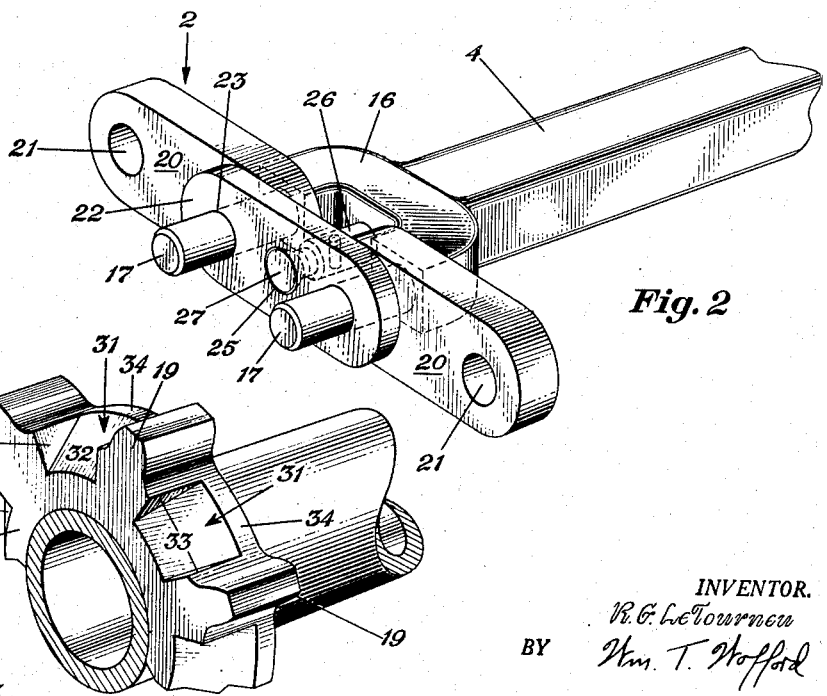
Fig. 2
Fig. 3
INVENTOR.
R. G. LeTourneau
BY Wm. T. Hofford
Attorney

United States Patent Office 2,784,836
Patented Mar. 12, 1957

2,784,836

SELF-CLEANING CHAINS AND SUPPORTING SPROCKETS

Robert G. LeTourneau, Longview, Tex.

Application April 5, 1954, Serial No. 421,094

7 Claims. (Cl. 198—203)

The invention relates generally to new and useful improvements in conveyer chain construction and supporting sprockets therefor, and more particularly to chains and supporting sprockets for endless conveyers of the type used for loading and unloading crushed, chopped, granulated, pulverized or the like material into or from vehicles or other material handling equipment employing conveyers.

In present conveyers of the type above-mentioned, there is a tendency for the material being handled to become packed, clogged, or jammed between the chains and driving or supporting sprockets. Such packing or jamming results in frequent damage necessitating costly repairs to the chains or sprockets or both in varying degrees dependent upon the kind of materials being handled by the conveyer.

Various attempts have been made to solve this problem and eliminate damage to conveyer chains and their supporting sprockets caused by packing or jamming of the materials being handled. For example, prior proposals have been made to equip conveyer chains, used in this kind of work, with heavy spring means that will sufficiently yield during abnormal strains to permit slight expansion of the chain in the event material being handled becomes clogged or jammed between the chain and supporting sprockets to an extent where damage will occur. Although it has been found that such means will partially relieve packing and jamming, it has other well-known undesirable aspects not found in non-yielding chains.

It is accordingly an object of my invention to provide an improved conveyer construction which will substantially eliminate the tendency for material being handled to become packed, clogged, or jammed between the conveyer chains and sprockets.

It is another object of my invention to provide an improved conveyer chain and sprocket construction which will eliminate the need for yielding or expanding devices within the chains.

Another object of my invention is to provide an improved conveyer chain construction which does not incorporate chain rollers.

A further object of my invention is to provide an improved conveyer chain and sprocket construction which will provide for self-cleaning action between the chains and sprockets.

A further object of my invention is to provide an improved conveyer chain and sprocket construction which will provide minimum contact area between the chains and sprockets.

Other objects and advantages of the invention will become apparent from the following description of a preferred embodiment of the invention taken in conjunction with the accompanying drawings; and the invention also constitutes certain new and novel features of construction and combination of parts hereinafter set forth and claimed.

In the drawings:

Fig. 1 is a somewhat schematic view in perspective illustrating one type of material handling vehicle, embodying an endless conveyer utilizing chains and supporting sprockets made in accordance with the teachings of the present invention.

Fig. 2 is an enlarged fragmentary perspective of a portion of the conveyer illustrating one end of one of the rigid cross bars or connecting slats and associated strap links.

Fig. 3 is a fragmentary perspective detail of one of the supporting or driving sprockets for the conveyer chains illustrated in Fig. 1.

Figure 4:
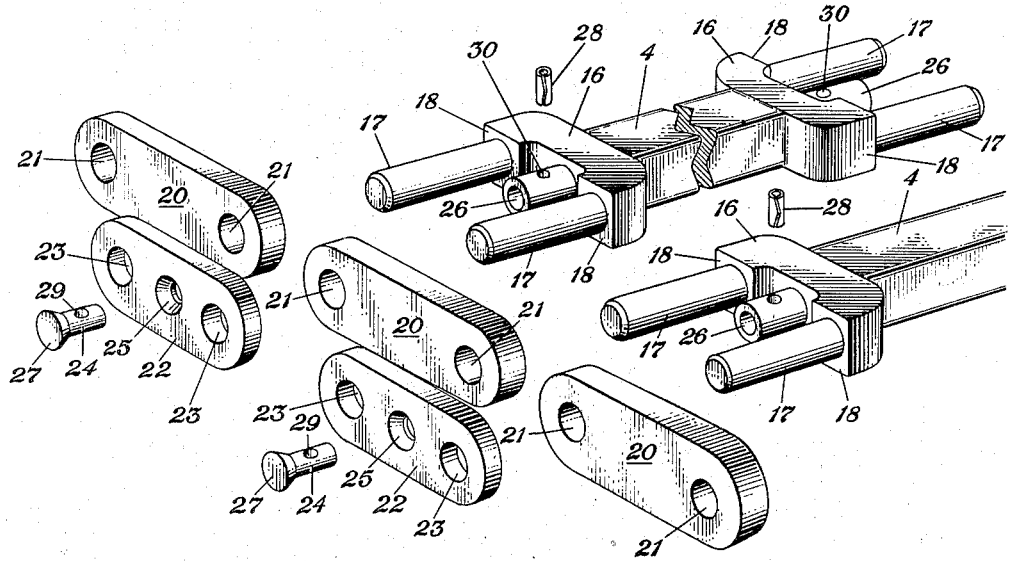
Fig. 4 is an exploded perspective detail illustrating the manner in which the strap links are assembled to the cross bars to form the conveyer chains, and, Figs. 5 and 6 are enlarged fragmentary plan and side elevational views respectively, to illustrate the self-cleaning feature and minimum contact area between the drive elements of the chains and sprockets.

Referring now to the drawings in detail, and for the present to Fig. 1, it will be seen that the conveyer structure according to the present invention is designated as a whole by reference numeral 1 and is characterized, broadly speaking, by a pair of parallel chains designated 2 and 3 respectively and connected to one another in spaced relationship by a series of rigid cross bars or connecting elements 4.

For purposes of illustration only the conveyer 1 is shown embodied in a side dump vehicle indicated generally by reference numeral 5. Such vehicle may include a body composed of a bottom 6, inclined front and rear walls 7 and 8, and inclined side wall 9, and an open side 10. The body may be suitably mounted upon any conventional chassis or framework 11 supported by wheels 12.

As further shown in Fig. 1 the chains 2 and 3 of the conveyer 1 are trained over pairs of sprockets 13 and 14 respectively. The sprockets are rotatably journaled and suitably supported adjacent the sides of bottom 6 of the vehicle body in any conventional manner (not shown) so that the upper course or reach of the chains 2 and 3 travels across the top surface of bottom 6 while the lower course of said chains travels beneath said bottom. Rotary motion can be imparted, in either direction, to the sprockets 13 and 14 through any suitable motor and gear reduction unit such as indicated at 15 in Fig. 1.

As previously stated, the present invention concerns itself primarily with the construction of the conveyer chains 2, 3 and their supporting and driving sprockets 13 and 14. Referring now to Fig. 1, it will be observed that all of the cross bars or connecting elements 4 for the chains 2 and 3 are of identical construction and a detailed description of one bar will therefor suffice for all. The "sling-shot" or bifurcated ends of bar 4 are each preferably formed by a laterally disposed outwardly curved arm 16 which terminates in a pair of aligned pins or pintles. The arms 16 may be formed integral with or welded to the bar ends and the pins or pintles projecting from the arms are cylindrical in cross section and reduced in diameter to form a shoulder 18 at the junction of the pins and arms as clearly shown in Fig. 4. The pins or pintles 17 serve a dual purpose the first of which is to constitute the joint pins for the conveyer chains and the second of which is to cooperate with the teeth 19 of sprockets 13 and 14 in a manner presently made clear.

The articulated joints between the bifurcated ends of adjacent bars 4 are formed by the pins or pintles 17 and a series of inner strap links 20 in the following manner. Each link 20 is supplied with a pair of spaced holes 21 to receive adjacent pins 17 of adjacent bars 4, as clearly shown in Fig. 4. Thus the bars are connected to one another in spaced parallel relation by the links 20, such links being held against shoulders 18 of arms 16 by a series of outer strap retainer links 22, the latter links also being provided with holes 23 to receive the pins 17.

Figure 5:
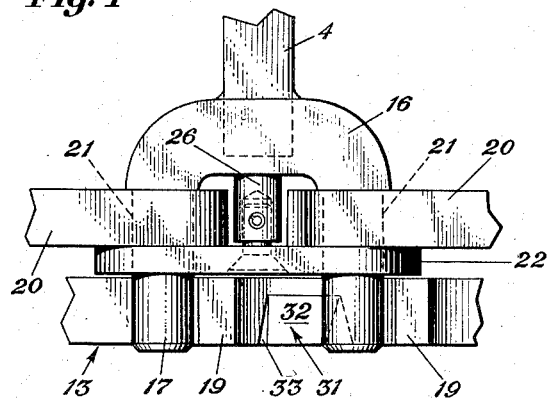
Figure 6:
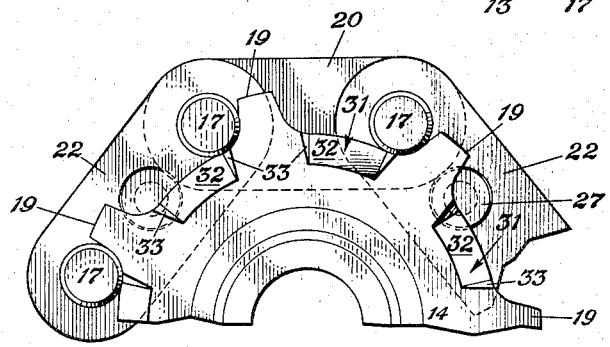

Each retainer link 22, as best shown in Fig. 4, is removably secured to its associated arm 16 by a headed stud 24, the stud being received by hole 25 in link 22 and inserted into the bore of tubular member 26 that projects from arm 16 and is disposed between and in alignment with pins 17. The outer end of hole 25 has an enlarged taper to snugly receive the tapered head 27 of stud 24, and the stud is held within the tubular member 26 by a friction fit pin 28 inserted into aligned holes 29 and 30 in the stud 24 and member 26 respectively as clearly shown in Figs. 5 and 6.

It will now be understood from Fig. 2 that the longitudinal dimension of pins or pintles 17 is such that their free ends project outwardly beyond the retainer links 22 for direct cooperative engagement with the teeth 19 of sprockets 13 and 14.

It has been previously mentioned that the conveyer chains and supporting sprockets of the present invention are specifically designed to include a self-cleaning feature that prevents material from becoming packed or jammed between the pins 17 and sprockets 13 and 14. This self-cleaning feature will now be described in detail with particular attention being directed to Figs. 3, 5, and 6. As shown in these figures, each sprocket is suitably formed with a plurality of inclined recesses 31, one between each pair of teeth 19, to reduce to a minimum the contact area between the pins 17 and sprockets 13 and 14. In the enlarged view, Fig. 6 will be observed that each recess is defined by an inclined side wall 32 and tapered end walls 33 and that the tapered end walls 33 underlie the pins 17 when the latter are in engagement with the teeth 19. It will be further observed from Figs. 3, 5, and 6 that the sprocket area between the teeth is reduced to a narrow ledge 34 which serves to crush or disperse material before it becomes clogged or jammed between the pins 17 and teeth 19.

During operation of the conveyer shown in Fig. 1, and assuming that the body of the vehicle is being loaded from the left-hand or open side 10, the power unit 15 may be rotated to move the bars 4 and in turn the material toward the inclined side wall 9 of the body. Obviously, when unloading the material from the body, rotation of the power unit 15 is reversed to move bars 4 across the bottom 6 of the body toward the open side 10.

While there has been shown and described only one embodiment of the present invention, it will be apparent to those skilled in the conveyer art that numerous modifications and variations may be made in the form and construction thereof, without departing from the spirit thereof.

I claim:

1. In a conveyer construction of the class described comprising, a plurality of cross bars having bifurcated ends terminating in aligned pintles, a series of inner links pivotally embracing adjacent pintles of adjacent cross bars to form articulated joints between said bars, a series of outer links each embracing pintles of a respective single cross bar and bearing against two of said inner links, and means detachably coupling said outer links with the bifurcated ends of said cross bars, said pintles projecting outwardly beyond said outer links to form drive elements for said conveyer.

2. A conveyer construction of the class described comprising, a plurality of cross bars having laterally disposed outwardly curved arms at their ends terminating in aligned pins of cylindrical cross section, inner links pivotally connecting the pins of adjacent arms to form articulated joints between said cross bars and to retain said bars in parallel relation relative to one another, outer links carried by said pins, and means to connect said outer links with said arms to pivotally retain said inner links upon said pins, said last named means comprising headed studs carried by said outer links and secured within tubular members located between said pins and projecting outwardly from said arms.

3. A conveyer construction of the class described comprising, a plurality of spaced parallel cross bars having laterally disposed and outwardly projecting arms at their ends terminating in aligned pins, a shoulder at the junction of each pin and its corresponding arm, a series of inner links pivotally mounted upon adjacent pins of adjacent arms forming articulated connections between said bars, an outer link for each bar rigidly retained upon the pins of said respective bar to position said inner links against said shoulders and between said outer links and said arms, and sprockets having teeth adapted to engage portions of said pins which project outwardly beyond said outer links.

4. A conveyer chain comprising, a plurality of driving pins disposed in aligned equally spaced parallel relation, bridging means fixing the ends of pairs of adjacent pins on one side of the chain in rigid spaced relation, strap links connecting adjacent pins of adjacent pairs to form articulated joints between pin pairs, retainer links connecting the pins of each pair intermediate their ends and holding said strap links against movement in the direction away from said bridging means, the free ends of said pins being adapted for driving engagement with a sprocket, whereby the link portion of said chain is disposed entirely on one side of said sprocket.

5. A conveyer chain comprising, a plurality of driving pins disposed in aligned equally spaced parallel relation, bridging means fixing the ends of pairs of adjacent pins on one side of the chain in rigid spaced relation, retainer links connecting the pins of each pair intermediate their ends, strap links disposed between said retainer links and said bridging means and connecting adjacent pins of adjacent pairs to form articulated joints between pin pairs, and means attached to each said retainer link and the corresponding bridging means for holding said retainer link against movement in the direction away from said bridging means, the free ends of said pins being adapted for driving engagement with a sprocket, whereby the link portion of said chain is disposed entirely on one side of said sprocket.

6. A conveyor construction of the class described comprising, a plurality of cross bars having bifurcated ends terminating in aligned pintles which constitute all of the pintles of a conveyor chain, a flat strap link associated with each pair of adjacent pintles of adjacent cross bars, said flat strap links having bearing engagement upon said pintles and acting to connect said bars in spaced parallel relation, flat retainer links bridging the pintles of each said cross bar and bearing against respective strap links, and means for securing said retainer links to said cross bars, said pintles projecting outwardly beyond the retainer links to form drive elements for the conveyor.

7. A conveyor construction of the class described comprising, a plurality of cross bars having laterally disposed outwardly curved arms at their ends terminating in aligned pintles of cylindrical cross-section, which pintles constitute all of the pintles of a conveyor chain, a flat strap link associated with each pair of adjacent pintles of adjacent cross bars, said flat strap links having bearing engagement upon said pintles and acting to connect said bars in spaced parallel relation, flat retainer links bridging the pintles of each said cross bar and bearing against respective strap links, and means comprising headed studs carried by said retainer links and secured within tubular members located between said pintles and projecting outwardly of said arms, for securing said retainer links to said cross bars, said pintles projecting outwardly beyond the retainer links to form drive elements for the conveyor.

References Cited in the file of this patent

UNITED STATES PATENTS

| | | | |
|---|---|---|---|
| D. 29,142 | Dunn | Aug. 2, | 1898 |
| 525,526 | Anderson | Sept. 4, | 1894 |
| 536,813 | MacPhail et al. | Apr. 2, | 1895 |
| 1,033,713 | Lepley | July 23, | 1912 |
| 1,683,653 | Brown | Sept. 11, | 1928 |
| 2,387,918 | Lockwood | Oct. 30, | 1945 |
| 2,394,006 | Osgood | Feb. 5, | 1946 |
| 2,546,262 | Hatcher | Mar. 27, | 1951 |